United States Patent [19]

Long

[11] Patent Number: 5,209,305
[45] Date of Patent: May 11, 1993

[54] AUTOMATED APPARATUS FOR REMOVING TRANSPLANT SIZE SEEDLINGS

[75] Inventor: Raymond C. Long, Raleigh, N.C.

[73] Assignee: North Carolina State University, Raleigh, N.C.

[21] Appl. No.: 752,874

[22] Filed: Aug. 30, 1991

[51] Int. Cl.⁵ .............................................. A01D 17/02
[52] U.S. Cl. .......................................... 171/7; 171/11; 171/127; 414/495; 414/502; 414/499; 414/540
[58] Field of Search ................. 171/7, 11, 114, 62, 171/127, 144; 56/27.5, 1, 16.6, 16.4; 414/495, 499, 502, 528, 529, 540

[56] References Cited

U.S. PATENT DOCUMENTS

| | | | |
|---|---|---|---|
| 716,706 | 12/1902 | Grohmann | 171/7 |
| 1,786,226 | 12/1930 | Bradley | 171/114 |
| 1,954,593 | 4/1934 | Kuly . | |
| 2,711,742 | 6/1955 | Lavers | 171/11 |
| 2,718,110 | 9/1955 | Butler | 171/114 |
| 3,159,270 | 12/1964 | Johnston | 171/127 |
| 3,163,234 | 12/1964 | Boyer | 171/17 |
| 3,194,317 | 7/1965 | Vautin | 171/1 |
| 3,240,276 | 3/1966 | Conant et al. | 171/17 |
| 3,247,909 | 4/1966 | Vautin | 171/17 |
| 3,301,331 | 1/1967 | Looker et al. | 171/127 |
| 3,597,909 | 8/1971 | Lauridsen et al. | 171/11 |
| 3,983,942 | 10/1976 | Vega | 172/32 |
| 4,262,477 | 4/1981 | Turold et al. | 171/127 |
| 4,313,502 | 2/1982 | Nelson | 171/63 |
| 4,382,472 | 5/1983 | van der Lely | 172/33 |
| 4,633,955 | 1/1987 | Gresham | 171/62 |
| 4,971,155 | 11/1990 | Peturis | 171/11 |
| 5,090,187 | 2/1992 | Mews | 56/16.4 |

Primary Examiner—Peter M. Cuomo
Assistant Examiner—Spencer Warnick
Attorney, Agent, or Firm—Richard E. Jenkins

[57] ABSTRACT

An apparatus for removing tobacco transplant seedlings from a plant bed by being connected to a tractor and pulled thereacross. An undercutter bar is provided at the front of the apparatus for undercutting a ribbon of soil which is then received by a conveyor defining an upwardly extending and a horizontally extending portion. A shaker mechanism provided beneath the conveyor serves to dislodge soil and smaller transplant seedlings from the seedlings as the seedlings are transported from the front to the rear of the automated apparatus. A boxing mechanism is provided at the rear of the automated apparatus which serves to fill containers with the transplant seedlings and then to deposit the filled containers upon the ground as the apparatus is pulled across a plant bed.

20 Claims, 6 Drawing Sheets

AUTOMATED APPARATUS FOR REMOVING TRANSPLANT SIZE SEEDLINGS

TECHNICAL FIELD

The present invention relates to a tobacco seedling harvester, and more particularly to an apparatus for use in the automated removal of tobacco transplant seedlings from tobacco plant beds.

RELATED ART

Traditionally, tobacco seedlings were removed from tobacco plant beds by hand in a time-intensive process whereby individual plants of an appropriate size were selected to be pulled. Thus, one person typically would pull about 15-20% of the plants in a plant bed at one time because only that percentage of plants would be of the appropriate size. Thereafter, perhaps one or two days later, the grower would come back to the same plant bed and would determine that there would be additional tobacco seedlings that had grown sufficiently in the interim to be appropriately sized for pulling from the plant bed. In this fashion, a grower might go to a tobacco plant bed two, three, or even four times to pull seedlings and plant them in the field and yet only a portion (perhaps around 50%) of the plants would be pulled from the plant bed. For this reason, the traditional pulling process from tobacco plant beds has been very inefficient.

In recent years there have been advances in the cultural handling of tobacco plant bed seedlings that has allowed the first plant pulling to provide more transplants than previously (perhaps as many as 50% of the plant bed in the first pulling). This has been accomplished by using a mower to clip the seedlings repeatedly to a predetermined height to impart uniformity of size to the seedlings prior to the first pulling. This process also allows for coming back for a second plant pulling and taking additional plants in excess of the initial 50% of plants removed in the first pulling. The result of this improvement and other cultural advancements in tobacco plant bed management has been a significant increase in the efficiency of the number of plants pulled as well as a corresponding decrease in the labor required to effect removal of the tobacco seedlings from the plant beds.

Applicant has significantly improved the tobacco plant bed seedling harvesting operation by developing an apparatus that provides for removing all of the seedlings from the plant bed at one time so as to be much more efficient than the presently utilized pulling procedure. As will be appreciated with reference to the detailed specification set forth below, applicant's apparatus is adapted to remove all plant bed seedlings from a plant bed regardless of their size and regardless of whether the plant seedlings are located randomly or in rows in the plant bed.

Applicant is aware of past attempts by others to build a plant bed transplant seedling puller based upon principles successfully utilized by mechanized radish pullers. In these previous attempts to develop a successful tobacco plant bed puller, a series of inclined V-belts were positioned closely together so as to allow the belts to grab the tops of the plants and gently lift them out of the plant bed soil. This apparatus was never really successful for several basic reasons. Firstly, the plant seedlings had to be arranged in rows in the plant bed in order for the apparatus to lift the plants from the plant bed with the V-belts. This required special seeding equipment in order to plant the bed so that the plant seedlings would grow in rows. Furthermore, the plant bed seedlings had to be sufficiently large to enable the V-belt configuration to grab them and properly remove them from the soil. Unfortunately, V-belts utilized by the apparatus tended to break shoots off the plants being removed as well as to bruise and damage the plant stem. For the foregoing reasons, the prior art plant bed pullers known to applicant were never satisfactory in use in pulling tobacco transplant seedlings or the like from a plant bed. Applicant believes that the instant apparatus meets a long-felt need for a reliable and successful automated apparatus for removing tobacco transplant seedlings from the plant bed. The apparatus also further lends itself to use in pulling transplants from seed beds in forestry nurseries as well as in the vegetable industry where it could successfully serve to remove such plant seedlings as tomatoes, peppers, cabbage, broccoli, cauliflower, celery, onions and other vegetable plant seedlings from plant beds.

DISCLOSURE OF THE INVENTION

In accordance with the present invention, applicant provides an automated apparatus for removing transplant size seedlings from a plant bed comprising a frame adapted to be pulled through a plant bed by a tractor. An undercutter bar is rotatably mounted at the front end of the frame and adapted to be pulled beneath the surface of a plant bed as it rotates upwardly toward the front end of the frame. A conveyor means is mounted on the frame which defines a first upwardly inclined portion and a second generally horizontal portion for receiving and transporting seedlings along the first portion and the second portion thereof, and a shaker means is carried by the frame and positioned under at least one of the first and second portions of the conveyor means for shaking the seedlings carried thereby. A seedling boxing means is positioned at the rear end of the frame for receiving seedlings from the second portion of the conveyor in a removable container and is adapted to vertically lower and deposit the container upon the plant bed when the container is filled with seedlings. Finally, suitable hydraulic means is used for actuating the conveyor means, undercutter bar means and shaker means of the automated It is therefore the object of the present invention to provide an automated apparatus for quickly and efficiently removing transplant size seedlings from a plant bed and removing the soil from the roots thereof.

It is another object of the present invention to provide an automated apparatus to quickly and efficiently remove transplant size seedlings from a plant bed and place them into a container which when filled is deposited onto the plant bed while the automated apparatus continues to operate.

It is another object of the present invention to provide an automated apparatus for removing all tobacco transplant seedlings from a plant bed at one time and to sort out and retain the suitably-sized transplant seedlings.

It is yet another object of the present invention to provide an automated apparatus for removing tobacco transplant seedlings from a plant bed in an automated manner without any adverse effects or damage to the seedlings pulled from the plant bed.

Some of the objects of the invention having been stated, other objects will become evident as the description proceeds, when taken in connection with the accompanying drawings.

BEST MODE FOR CARRYING OUT THE INVENTION

A preferred embodiment of an apparatus in accordance with the present invention is depicted in FIGS. 1-6 of the drawings and generally designated by the reference numeral 10. Apparatus 10 is adapted to be powered by a hydraulic pump which is coupled to the power take-off on a tractor and pulled by the tractor (not shown) over tobacco plant beds from which tobacco seedlings are to be harvested for subsequent replanting in the fields. The apparatus comprises a frame 12 mounted on gauge wheels 13 and which carries an endless conveyor 14 defining a first upwardly extending portion 14A and a second horizontally extending portion 14B. A rotating undercutter bar 16 is provided at the front of frame 12 and is driven by conveyor 14 through a gear and sprocket mechanism which will be described in detail hereinbelow.

Figure 1:
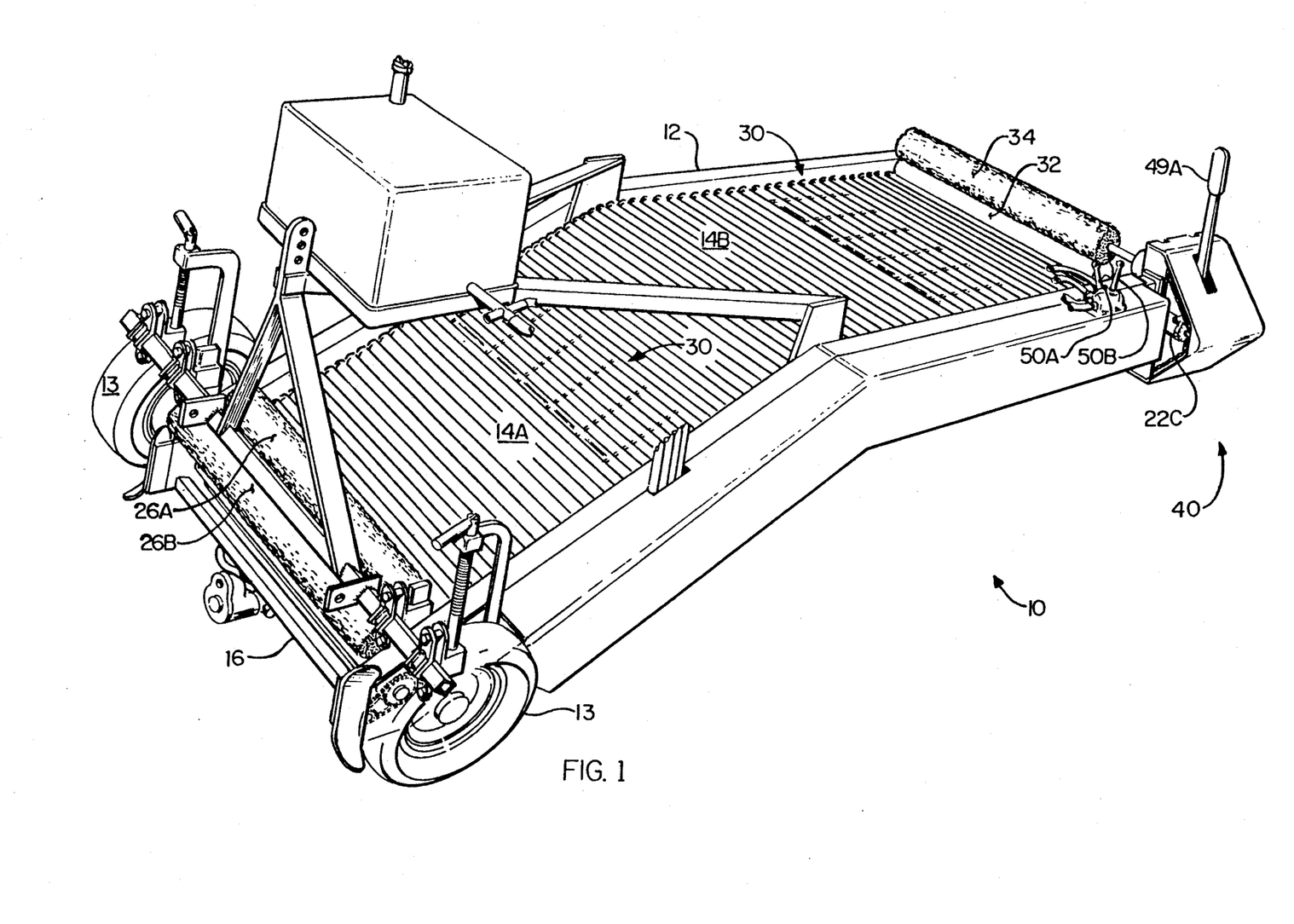
FIG. 1 is a perspective view of an automated apparatus for removing transplant size seedlings embodying the principles of the invention (with the hydraulic hoses removed for greater clarity)

Undercutter bar 16 is preferably formed from a square cross-section metal bar having dimensions of 1.25 inches by 1.25 inches. The rotating undercutter bar 16 serves several important functions as it is pushed ahead of apparatus 10 beneath the surface of the plant bed. Firstly, undercutter bar 16 serves to undercut the tobacco seedlings. Secondly, since the undercutter bar is rotating against the direction of travel, it serves to provide a measure of lift to the ribbon of plant bed soil being undercut so that it goes up onto conveyor 14 more easily than could be accomplished by merely pushing a conventional forwardly-mounted fixed blade beneath the plant bed. Also, whereas a conventional blade would simply be pushed through the soil, the rotating undercutter bar breaks up the soil due to the rotation thereof and, in so doing, serves to also break the fibrous roots of the tobacco transplant seedlings to facilitate removal of the soil. The breakage of the soil is desirable since it renders it more easily to drop through conveyor belt 14 as apparatus 10 traverses a plant bed.

Figure 2:
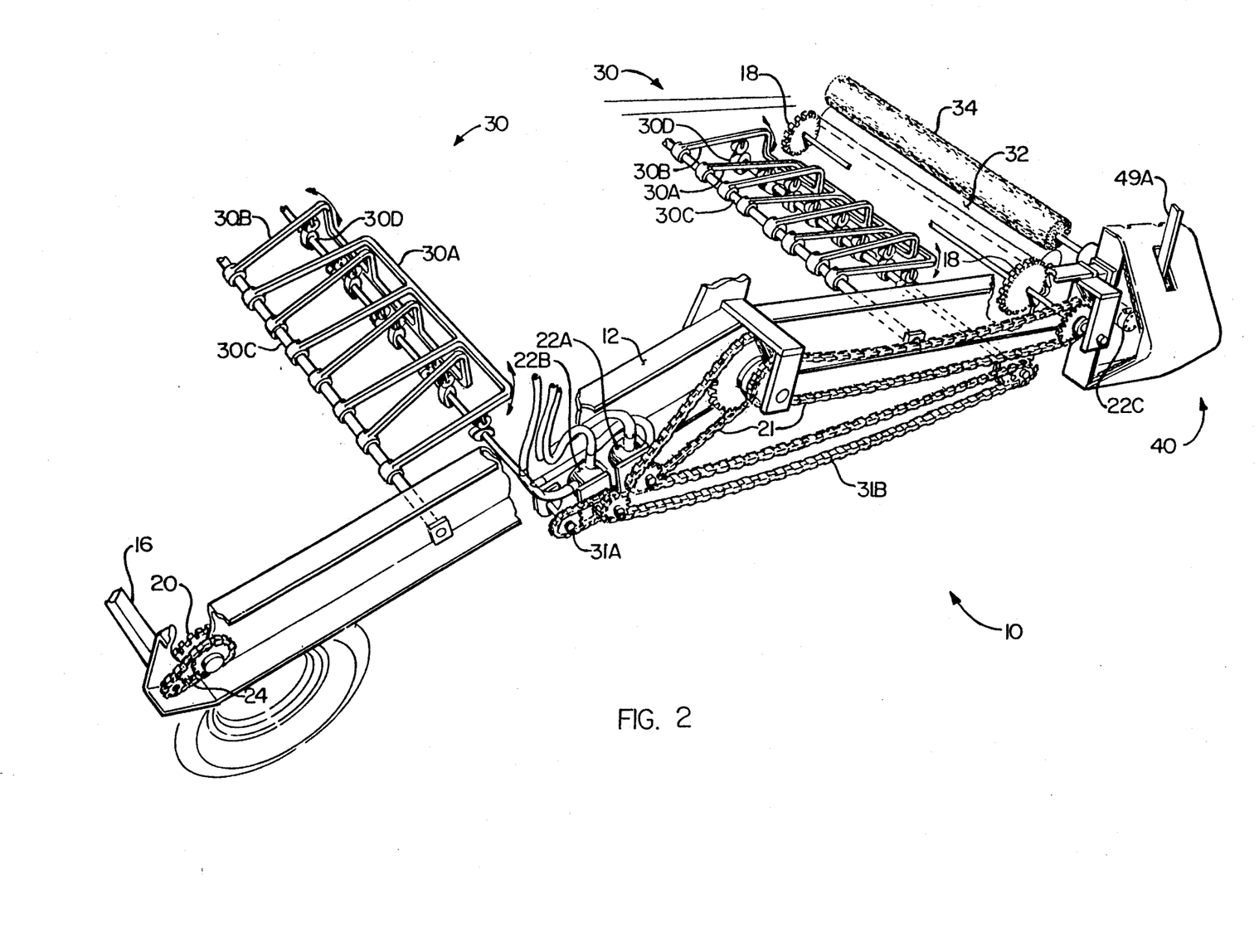
FIG. 2 is a fragmentary perspective view, with parts broken away, illustrating the conveyor drive and shaker mechanism of the apparatus.

Referring back to conveyor 14, applicant has found that the conveyor works well when fabricated from 7/16 inch diameter metal rods which are spaced 1¼ inches on center so as to define a distance therebetween of about ¾ of an inch. The metal rods define an incline of approximately 30° along section 14A of conveyor 14 and rise to a height of about 26 inches before leveling off to define section 14B of the conveyor. Conveyor 14 moves endlessly around two drive sprockets 18 at the rear end of apparatus 10 and two freely rotating sprockets 20 at the forward end of apparatus 10. With reference to FIG. 2, it can be seen that drive sprockets 18 are powered through a sprocket and chain drive 21 by a first hydraulic motor 22A. At the leading edge of the conveyor 14 one of the two freely rotatable sprockets 20 which are driven by movement of conveyor 14 therearound serves to rotate undercutter bar 16 by means of sprocket and chain drive 24.

As best seen in FIG. 1, two foam rollers 26A, 26B are provided at the front of apparatus 10 to facilitate movement of the seedlings onto conveyor 14. The first roller 26A is positioned about 8-9 inches above undercutter bar 16 so that as apparatus 10 is pulled through a plant bed the lower edge of the roller contacts the upper part of seedlings in the plant bed. The second roller 26B is positioned behind the first roller and closer to conveyor 14. Thus, as the ribbon of soil containing transplant seedlings is lifted by undercutter bar 16 onto conveyor 14, second roller 26B presses the tops of the plants downwardly and forwardly so that the roots thereof will be oriented towards the rear of apparatus 10 as they move upwardly on conveyor 14. This is advantageous because the roots of the plants of each new layer of transplant seedlings tend to cushion the shoots of the previous layer of plants positioned on conveyor 14 and thereby helps to prevent damage to the stems of the plants. Additionally, foam rollers 26A, 26B serve to prevent the ribbon of soil removed from the plant bed by undercutter bar 16 from "snowballing" as it contacts the leading edge of conveyor 14. Although the preferred embodiment of the invention utilizes both foam rollers 26A, 26B as described hereinabove, it is contemplated that apparatus 10 could be adapted to utilize either one of two foam rollers 26A, 26B as a matter of design choice.

As best seen in FIG. 2, positioned beneath both conveyor portion 14A and conveyor portion 14B is a shaker mechanism which is generally designated 30. Shaker mechanism 30 comprises two independent grids 30A, 30B which are pivotably mounted at one end to fixed bar 30C and which are actuated at different times by camshaft 30D. Thus, one grid is pushed up as another drops down beneath both portion 14A and portion 14B of conveyor 14 in order to provide a shaking action to both sections of the conveyor. The shaking action provided to each section of conveyor 14 serves to dislodge soil from the root system of the transplant seedlings which then drops through conveyor 14 onto the plant bed surface over which apparatus 10 is being pulled. Also, and very desirably, very small transplant seedlings will also drop through conveyor 14 due to the shaking action provided by shaker mechanisms 30 which effectively sorts the transplant seedlings by removing the smaller plants from conveyor 14 as it moves from the forward end to the rearward end of apparatus 10. As clearly shown in FIG. 2, the shaker mechanism 30 beneath both conveyor portion 14A and the shaker mechanism 30 beneath conveyor portion 14B are driven by hydraulic motor 22B by a first chain and sprocket drive 31A to one shaker mechanism 30 and a second chain and sprocket drive 31B to the second shaker mechanism 30. Although the preferred embodiment of the invention comtemplate the use of shaker mechanisms 30 beneath both conveyor portion 14A and conveyor portion 14B, as a matter of design choice a single shaker mechanism 30 could be utilized beneath either conveyor portion 14A or conveyor portion 14B in an alternative embodiment to the present invention.

With reference now to FIGS. 1-4, it can be seen that as the seedlings approach the rear of conveyor 14 they encounter a pick-off roller 32 which is positioned immediately behind the end of conveyor 14 and which is preferably fabricated from an aluminum tube covered with a suitable indoor-outdoor carpet material. Roller 32 serves to grab the seedlings as they come off conveyor 14 and deposit them into container C without injury thereto. Pick-off roller 32 is directly powered by hydraulic motor 22C which rotates roller 32 at a sufficiently high speed that the surface speed thereof is much greater than the surface speed of conveyor 14. A foam roller 34 is positioned immediately above pick-off roller 32 and is adapted for free rotation and free vertical movement so as to provide a minimal amount of weight on plants passing between foam roller 34 and positively-driven pick-off roller 32. Foam roller 34 serves to press the transplant seedlings passing therebeneath into the rough surface of pick-off roller 32 so that they will be positively propelled rearwardly into container C for accumulation.

Figure 3:
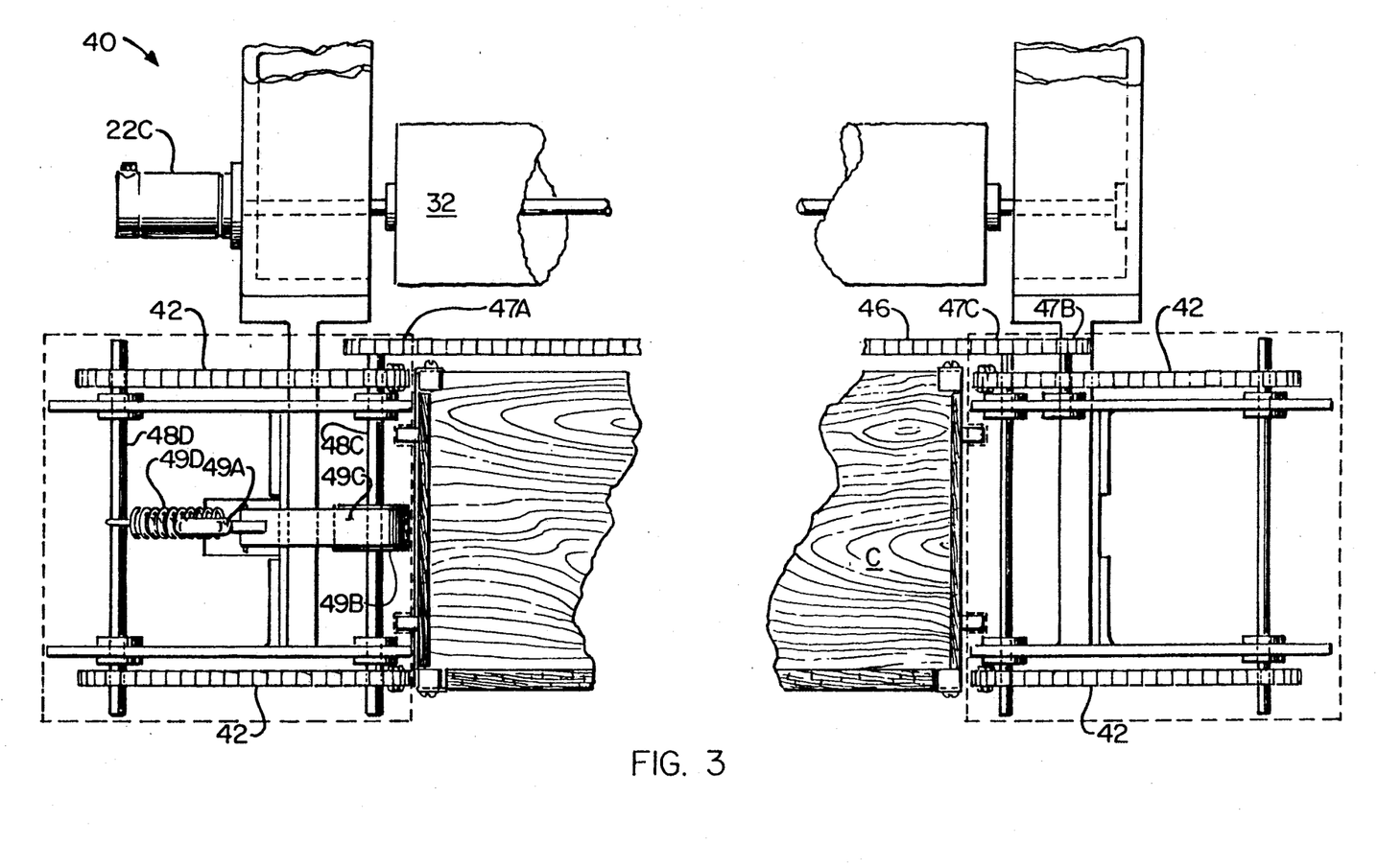
FIG. 3 is a fragmentary top plan view of the boxing mechanism of the apparatus.
Figure 4:
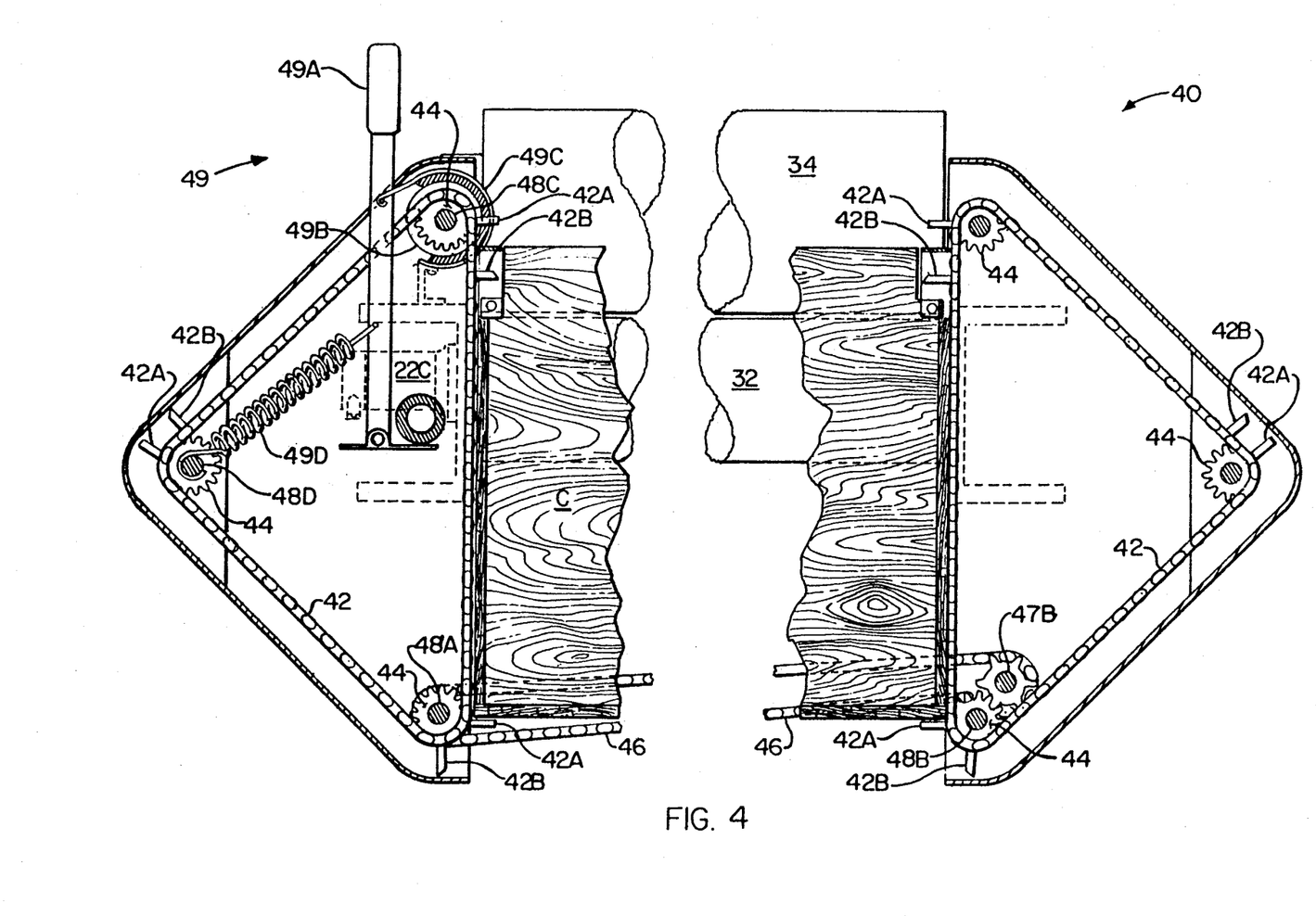
FIG. 4 is a fragmentary rear end elevation view of the boxing mechanism of the apparatus.
Figure 5:
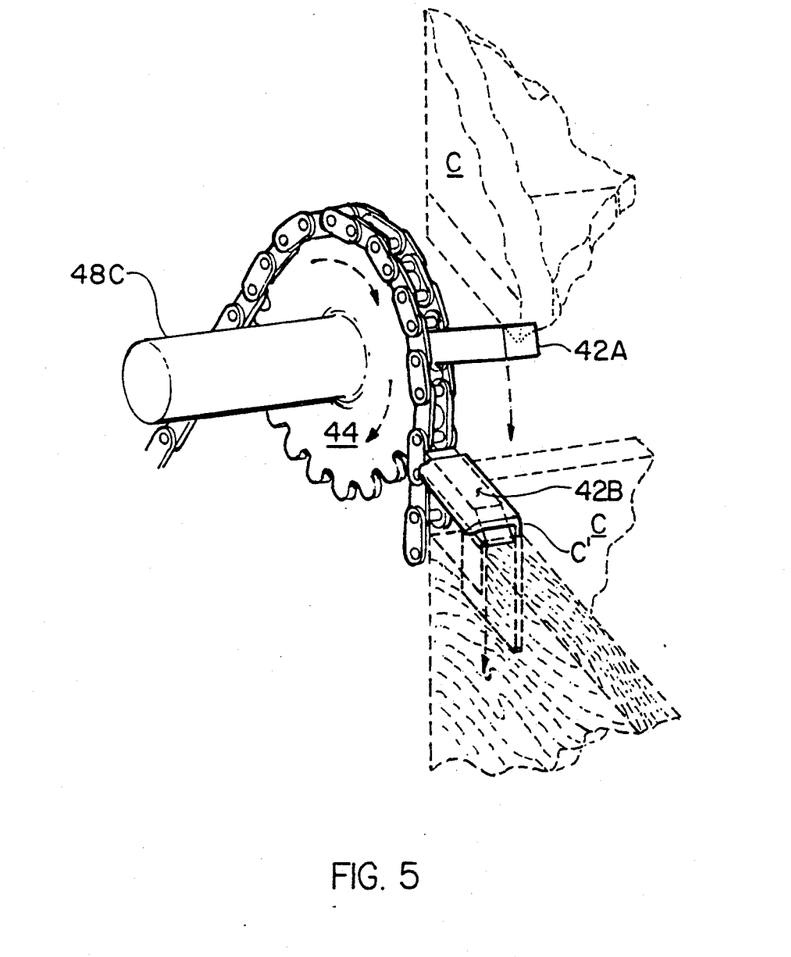
FIG. 5 is a fragmentary view in perspective of the container engagement means of the boxing mechanism of the apparatus.

With reference now particularly to FIGS. 3 and 4, the seedling boxing or collection mechanism, generally designated 40, will be described in detail. As best seen in FIGS. 3 and 4, boxing mechanism 40 comprises a pair of roller chains 42 on each side of boxing mechanism 40 positioned at the rear of apparatus 10. Each pair of roller chains 42 travels about three corresponding pairs of sprockets 44 which define a triangular configuration with the inside lengths thereof extending substantially vertically from upper sprockets 44 to lower sprockets 44 and parallel to the corresponding inside lengths of roller chains 42 on the opposing side of boxing mechanism 40. The inside runs of each pair of roller chains 42 move downwardly in the vertical direction from top sprockets 44 to lower sprockets 44 as best seen in FIG. 4 of the drawings.

The opposing pairs of chains 42 of boxing mechanism 40 are not powered but will tend to free-wheel when container C is secured to the top portion thereof which serves to force the inside lengths of the opposing pairs of roller chains 42 downwardly from the top pair of sprockets 44 on each side of boxing mechanism 40 to the lowermost pair of sprockets 44 on each side of boxing mechanism 40. A cross chain 46 extends across boxing mechanism 40 from one pair of roller chains 42 to the second pair of roller chains 42 on the opposing side of boxing mechanism 40. Cross chain 46 is connected at one side to a sprocket 47A on the lowermost shaft 48A associated with one pair of roller chains 42 and at the other side thereof to a first sprocket 47B which interacts with a second sprocket 47C on shaft 48B upon which the lowermost sprockets 44 of the second pair of roller chains 42 travel in order to assure that both roller chains move at the same speed and in the same direction in order to lower a seedling container C in an orderly fashion from an uppermost position adjacent conveyor 14 to a lowermost position where container C is discharged from boxing mechanism 40 and allowed to fall onto the transplant bed passing beneath apparatus 10.

A brake mechanism 49 is attached to shaft 48C for the upper sprockets 44 on one side of boxing mechanism 40 and is spring loaded in order to provide positive braking to roller chains 42 at all times. As best seen in FIGS. 3 and 4, brake 49 comprises a pivotable brake handle 49A, a brake drum 49B affixed to shaft 48C and a metal band 49C (with a leather or other suitable inside surface) which is secured at one end to boxing mechanism 40 and at the other end to brake handle 49A so that as brake handle 49A is pulled outwardly tension will be applied to brake drum 49B so as to retard the rotational speed of shaft 48C. A spring 49D is secured at one end to brake handle 49A and at the other end to shaft 48D of the outermost pair of sprockets 44 on the left hand side of boxing mechanism 40 in order to normally urge brake handle 49A outwardly to apply a braking force to shaft 8C and thereby to both pairs of roller chains 42 of boxing mechanism 40. Although only one brake mechanism 49 is described hereinabove for use in conjunction with one side of boxing mechanism 40, applicant contemplates that as a matter of design choice an additional brake mechanism could be provided on the other side of boxing mechanism 40.

Also, each roller chain 42 is provided with three pairs of outwardly extending spaced-apart dogs 42A, 42B which serve to engage container C at the uppermost height of the inside runs of each opposing pair of roller chains 42 and to transport container C downwardly and (at the end of the inside runs) to disengage the container so as to drop it upon the plant bed surface therebeneath. Each pair of dogs 42A, 42B are preferably about 1.50 inches apart and are initially positioned about 4 inches from top sprockets 44 on the inside vertical runs for each pair of roller chains 42 on opposing sides of boxing mechanism 40.

A container C is placed on the upper dog 42A of each pair of dogs provided at the top of each of the four vertical runs for the four roller chains 42 utilized by boxing mechanism 40 to transport container C. Brake 49 would be released to allow container C to drop to a position so that the bottom of container C is slightly below the level of pick-off roller 32 so that the transplant seedlings can be propelled directly therein. As container C fills with seedlings, the operator of boxing mechanism 40 of apparatus 10 would gradually release brake handle 49A until the lowermost dog 42B of the next pair of dogs on each of the four sets of roller chains 42 comes over a corresponding top sprocket 44 and engages a corresponding bracket C' (FIG. 5) at each of the four top corners of container C so as to hold container C as it is disengaged by dog 42A of each of the four pairs of dogs at the bottom thereof. As container C continues to move downwardly while engaged only at its four top corner brackets C', another container C is placed on the top dogs 42A of the second set of four dog pairs as they move downwardly on each side of boxing mechanism 40. By the time the first container C is filled with seedlings, dog 42B for each of the four pairs of dogs will disengage from a corresponding container bracket C' at the bottom of the vertical run of roller chains 42 so as to release container C to fall onto the ground and place the next container C thereabove at a position to begin to receive transplant seedlings.

Figure 6:
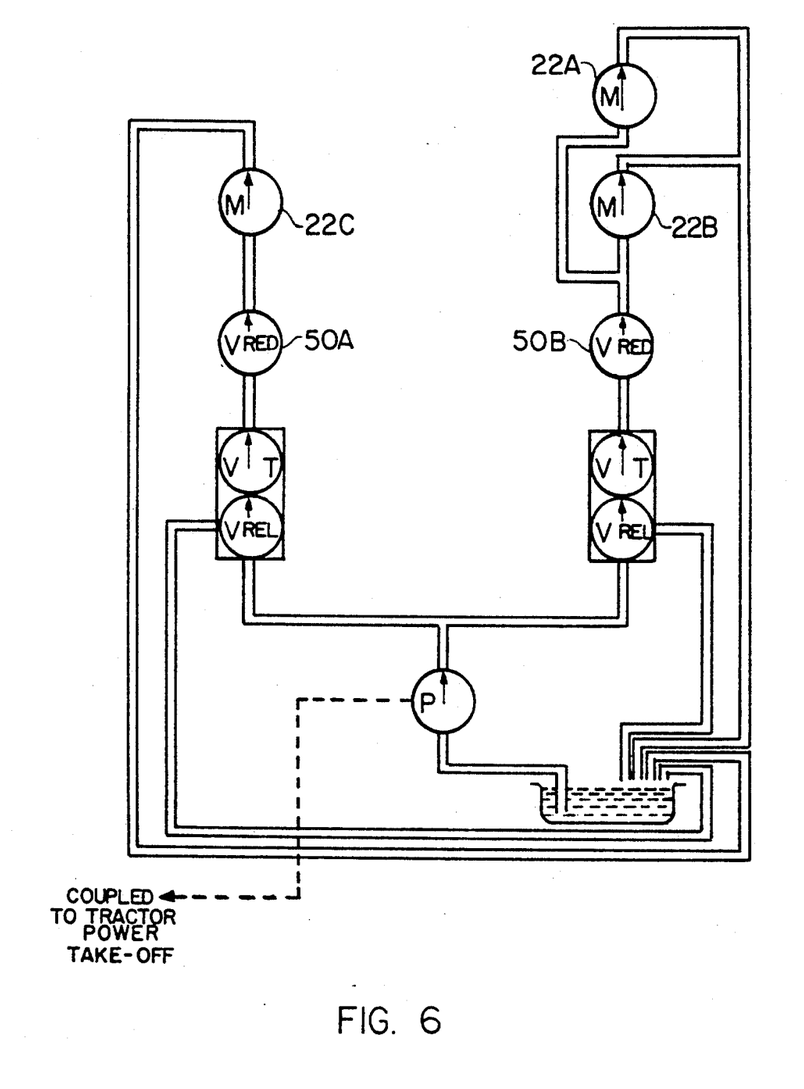
FIG. 6 is a simplified schematic view of the hydraulic circuit of the apparatus.

By way of further explanation, it should be appreciated that container C is a box having a preferred size of about 12 inches in depth, about 16 inches in height and about 51 inches in length. Container C has a bottom, a rear wall, and two end walls. A front wall to container C is not provided so that transplant seedlings may be easily propelled from pick-off roller 32 directly into the container. Applicant contemplates that container C may be fabricated from any suitable material such as formed metal or sheet metal or fabricated from plastic or wood. With reference to FIGS. 1 and 6, it can be noted that applicant also provides adjustable flow valve 50A in the hydraulic line to hydraulic motor 22C as well as an adjustable flow valve 50B in the hydraulic line to hydraulic motors 22A and 22B. The adjustable flow valves allow for control of the speed of pick-off roller 32 as well as conveyor 14 and shaker mechanisms 30, respectively. This is important since applicant has discovered that it is preferable for the surface speed of conveyor 14 to be approximately 15-20% greater than the actual ground speed of apparatus 10, and that the surface speed of undercutter bar 16 should be greater than the ground speed of apparatus 10. The relatively higher surface speed of undercutter bar 16 and conveyor 14 serves to better break up the plant bed soil and load the ribbon of soil containing the transplant seedlings onto conveyor belt 14 during movement of apparatus 10 across a plant bed.

Applicant wishes to again note that although the detailed description provided hereinbefore describes apparatus 10 in terms of being an automated apparatus for removing tobacco transplant seedlings from a plant bed, applicant contemplates other uses for the apparatus, particularly in the tree nursery and vegetable industries. Applicant believes that the apparatus of the invention would effectively serve to harvest plant beds containing tomato seedlings, pepper seedlings, cabbage seedlings, broccoli seedlings, cauliflower seedlings, celery seedlings, onion plants and similar types of vegetable seedlings. Thus, applicant does not wish to limit the scope of the instant invention to merely an apparatus for harvesting tobacco transplant seedlings, but contemplates that the scope of the invention is significantly greater.

It will be understood that various details of the invention may be changed without departing from the scope of the invention. Furthermore, the foregoing description is for the purpose of illustration only and not for the purpose of limitation—the invention being defined by the claims.

What is claimed is:

1. An automated apparatus for removing transplant size seedlings from a plant bed comprising:
    a frame adapted to be pulled through a plant bed by a tractor and having a front end and a rear end;
    undercutter bar means rotatably mounted at the front end of said frame and adapted to be pushed beneath the surface of a plant bed as said undercutter bar means rotates upwardly toward the front end of said frame;
    conveyor mean mounted on said frame defining a first upwardly inclined portion and a second generally horizontal portion for receiving and transporting seedlings along the first portion and the second portion thereof;
    shaker means carried by said frame and positioned under at least one of said first and second portions of said conveyor means for shaking the seedlings carried thereby;
    seedling boxing means positioned at the rear end of said frame for releasably engaging a container positioned for receiving seedlings from the second portion of said conveyor means and conveying the container from an upper position adjacent said conveyor to a vertically lower position where the seedling-filled container is released to fall upon the plant bed; and
    hydraulic means for actuating said conveyor means, undercutter bar means and shaker means.

2. An apparatus according to claim 1 including at least one seedling guide roller rotatably mounted to the front end of said frame above said undercutter bar means.

3. An apparatus according to claim 2 wherein said at least one roller is mounted for free rotation.

4. An apparatus according to claim 1 including at least one rotatably-driven seedling pick-off roller mounted to the rear end of said frame adjacent to said conveyor means for removing seedlings therefrom and introducing the seedlings into said seedling boxing means.

5. An apparatus according to claim 4 wherein the surface speed of said roller is greater than the surface speed of said conveyor means.

6. An apparatus according to claim 1 wherein said undercutter bar means comprises a square cross-section bar about 1.25 inches by 1.25 inches.

7. An apparatus according to claim 1 wherein said shaker means comprises a camshaft actuated vibrator operatively positioned beneath each of said first portion and said second portion of said conveyor means.

8. An apparatus according to claim 1 wherein said seedling boxing means comprises one or more endless chains on each side thereof for releasably engaging the seedling container and conveying the container from an upper position adjacent said conveyor to a vertically lower position where the filled container is released to fall onto the plant bed.

9. An apparatus according to claim 8 including a manual brake operatively connected to at least one of said endless chains for controlling the downward speed of movement of the container.

10. An apparatus according to claim 1 wherein said hydraulic means comprises a hydraulic circuit including a hydraulic pump fluidly connected to a first hydraulic motor for actuating the conveyor means and undercutter bar means and a second hydraulic motor for actuating said shaker means.

11. An apparatus according to claim 10 wherein said hydraulic circuit includes at least one adjustable flow valve to control the speed of said first and second hydraulic motors.

12. An automated apparatus for removing transplant size seedlings from a plant bed comprising:
    a frame adapted to be pulled through a plant bed by a tractor and having a front end and a rear end;
    an undercutter bar rotatably mounted at the front end of said frame and adapted to be pushed beneath the surface of a plant bed as it rotates upwardly toward the front end of said frame;
    conveyor means mounted on said frame defining a first upwardly inclined portion and a second generally horizontal portion for receiving and transporting seedlings along the first portion and the second portion thereof;
    shaker means carried by said frame and positioned under at least one of said first and second portions of said conveyor means for shaking the seedlings carried thereby;
    one or more endless chains positioned on opposing sides at the rear end of said frame for releasably engaging a container positioned for receiving seedlings from the second portion of said conveyor means and conveying the container from an upper position adjacent said conveyor to a vertically lower position where the seedling-filled container is released to fall onto the plant bed; and hydraulic means for actuating said conveyor means, undercutter bar means and shaker means.

13. An apparatus according to claim 12 including at least one seedling guide roller rotatably mounted to the front end of said frame above said undercutter bar means.

14. An apparatus according to claim 13 wherein said roller is mounted for free rotation.

15. An apparatus according to claim 12 including at least one rotatably driven seedling pick-off roller mounted to the rear end of said frame adjacent to said conveyor means for removing seedlings therefrom and introducing the seedlings into the seedling container.

16. An apparatus according to claim 15 wherein the surface speed of said roller is greater than the surface speed of said conveyor means.

17. An apparatus according to claim 12 wherein said undercutter bar means comprises a square cross-section about 1.25 inches by 1.25 inches.

18. An apparatus according to claim 12 wherein said shaker means comprises a camshaft actuated vibrator operatively positioned beneath each of said first portion and said second portion of said conveyor means.

19. An apparatus according to claim 12 including a manual brake operatively connected to at least one of said endless chains for controlling the downward speed of movement of the container.

20. An apparatus according to claim 12 wherein said hydraulic means comprises a hydraulic circuit including a hydraulic pump fluidly connected to a first hydraulic motor for actuating the conveyor means and undercutter bar means, a second hydraulic motor for actuating said shaker means, and at least one adjustable flow valve to control the speed of said first and second hydraulic motors.

* * * * *